O. L. MILLS

ELECTRIC ARC FURNACE

Feb. 3, 1931. Re. 17,954

Original Filed March 5, 1929 2 Sheets-Sheet 1

INVENTOR
Oscar L. Mills
BY John Flam
ATTORNEY

O. L. MILLS

ELECTRIC ARC FURNACE

Feb. 3, 1931. Re. 17,954

Original Filed March 5, 1929 2 Sheets-Sheet 2

INVENTOR
Oscar L. Mills
BY John Flaw
ATTORNEY

Reissued Feb. 3, 1931

Re. 17,954

UNITED STATES PATENT OFFICE

OSCAR L. MILLS, OF LOS ANGELES, CALIFORNIA, ASSIGNOR TO MILLS ALLOYS INC., OF LOS ANGELES, CALIFORNIA, A CORPORATION OF DELAWARE

ELECTRIC-ARC FURNACE

Original No. 1,719,558, dated July 2, 1929, Serial No. 344,494, filed March 5, 1929. Application for reissue filed September 30, 1930. Serial No. 485,540.

This application is a continuation in part of my prior application, Serial No. 331,747, filed January 11, 1929, and entitled "Process and apparatus for making tungsten alloys."

It is one of the objects of my invention to provide a furnace utilizing the electric arc for melting substances, and especially to make it possible to secure a working temperature neighboring 6000° F. Such a temperature is required for example, to melt tungsten, and to cause it to combine chemically with carbon to form the tungsten carbides. These materials are useful in connection with cutting or drilling tools (such as oil well drill bits) because of their extreme hardness. One process for manufacturing this material is claimed and described in my prior application hereinbefore identified, and my furnace is especially useful for carrying out that process. However, it can obviously be applied wherever an extremely high temperature is required, especially at localized spots.

I attain these high temperatures by a novel furnace structure that effectively conserves the heat created by an electric arc between electrodes, or between an electrode and the material being treated. I utilize not only the heat directly centered upon the material, but also reflected heat from the roof or ceiling of the furnace.

My invention is especially adapted for the efficient production of tungsten carbide, where quick, uniform, and intense heat is required to produce a high grade product.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

Figure 2:
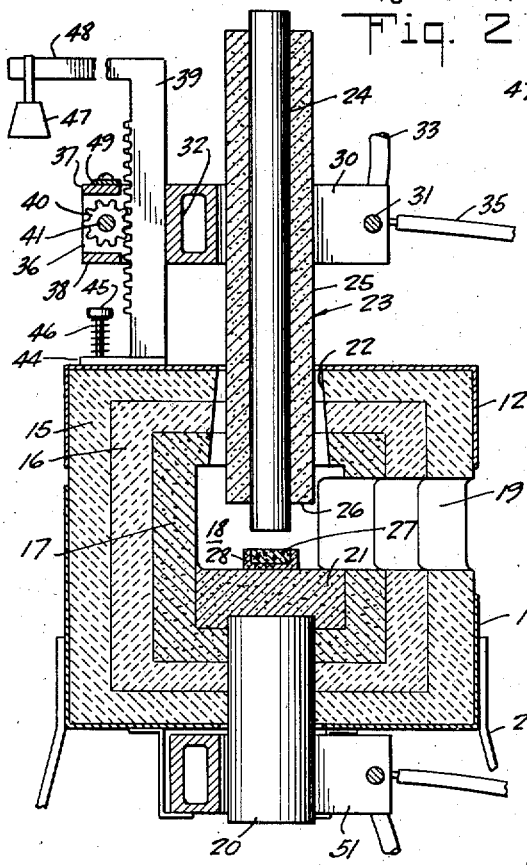
Fig. 2 is a longitudinal section thereof.

The furnace proper can include a lower base or container 11 of sheet metal, shown as in the form of a cup. The cover 12 is similar in form. There is a space between the opposed edges of the base or container 11 and the cover 12, although a number of straps 13 connect the two. Since the base and cover may be each connected to current carrying parts, there are insulating strips 14 between the straps and one of the elements 11, 12 so as to prevent short-circuting between these parts.

The walls of the furnace are built in a multiple layer, as shown most clearly in Fig. 2. The outermost layer 15 can be made up of a layer of good heat insulation, not necessarily highly refractory; such as "silocell" bricks, which are made from diatomaceous earth. The second layer 16 can be built up from vitreous brick; and the innermost layer 17 should be made from highly refractory material, such as "carbofrax" brick. I have shown these layers 15, 16, 17 in a digrammatic fashion; it is to be understood however that these layers are deposited brick by brick in container 11 and finally covered over by the cover 12.

These layers form a comparatively small or confined furnace chamber 18 having an opening 19 whereby the operation can be viewed by an attendant. I prefer to utilize carbon electrodes between which an arc can form inside of the chamber 18. Thus there is a lower electrode 20 of carbon, projecting through an aperture in the bottom of base 11, and over it is disposed a thick layer or floor 21 of carbon dust or particles or both.

Projecting through the top aperture 22 is an electrode structure 23. It is to be noted that this aperture 22 widens at the bottom, so as to prevent any possibility of the electrode arcing to the inside edge of the aperture, and thereby short-circuit by way of the walls of the furnace.

The structure 23 can include a carbon core 24 that forms the electrode proper; it can also be rather tightly encompassed by an apertured bar 25, which is also preferably made from carbon. The core 24 can project slightly beyond the outer member 25, whereby an annular shoulder or surface 26 is formed, surrounding core 24 and spaced above its lower end. The arc is intended to be formed between the lower end of core 24 and material placed in contact with layer 21, and which is to be subjected to the heat of the arc. This material 27 is in powdered or granular form, as indicated in my prior application, can be held in a carbon container 28. This container is shallow so as to ensure uniform heating from the arc, the depth of the space therein being no greater than about three-fourths of the diameter, or of the average width, of this space. The circuit is completed between electrode 24 and electrode 20 through 21, container 28, material 27 and the arc itself.

Persons skilled in the art of course understand that surface 26 is not maintained as a horizontal surface after some operation of the furnace. Instead, the lower portion of member 25 wears to some extent, making surface 26 conical.

I find that an arc voltage of between 30 and 40 volts is best; as it permits the surface 26 as well as the end of core 24 to be kept very close to the material 27, and thereby causes it effectively to act as a heat reflecting surface. A further separation corresponding to larger arc voltages, would tend to reduce the effectiveness of these surfaces, as well as to splash the work from the container and to form an arc to the walls of the furnace.

Figure 1:
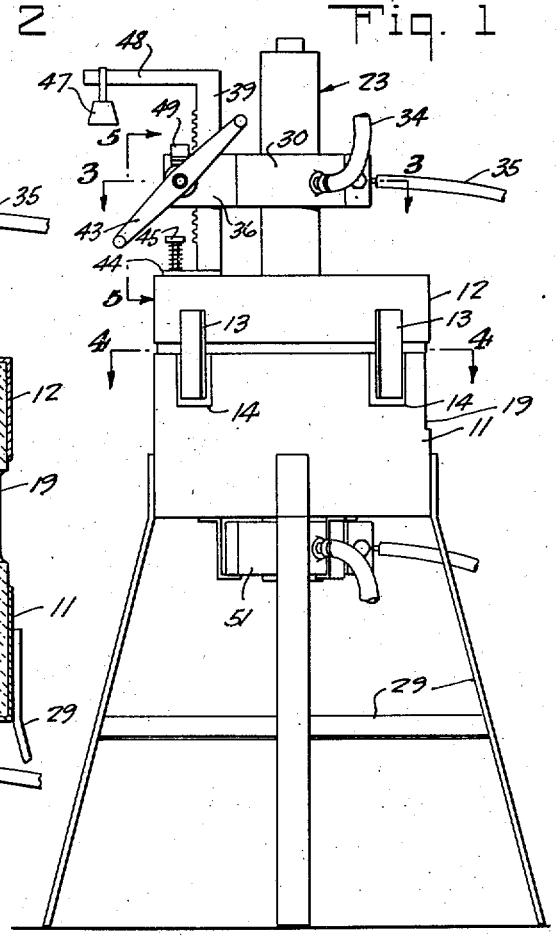
Figure 1 is a side elevation of a furnace embodying my invention.
Figure 3:
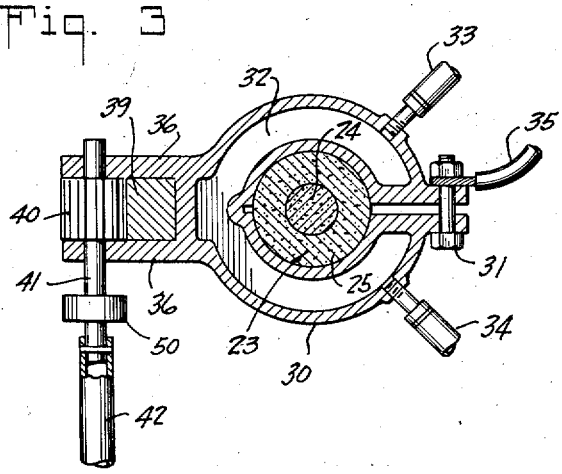
Fig. 3 is a sectional view, taken along plane 3—3 of Fig. 1.
Figure 4:
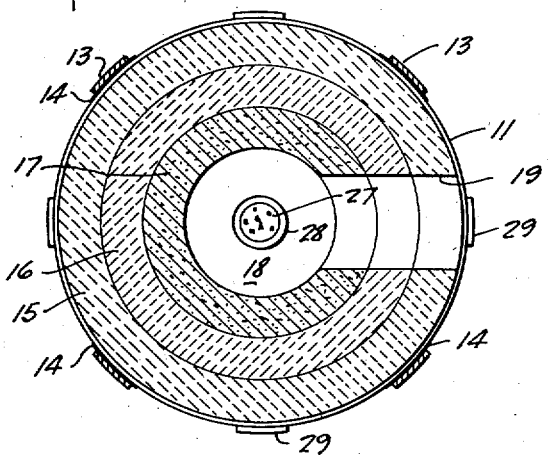
Fig. 4 is a sectional view, taken along plane 4—4 of Fig. 1.

The entire furnace can be supported on a framework 29. The upper electrode structure 23 is arranged to be axially movable so as to adjust the arc length. For this purpose, and electrode holder 30 is provided (Figs. 1, 2, and 3). It is formed as a split ring, with a tightening bolt 31 to clamp it tightly on rod 25. It can be water cooled, as by the provision of the water jacket 32, the inlet and outlet being generally indicated at 33 and 34. Bolt 31 also serves to connect a conductor 35 to the holder ring 30 so as to lead current to the structure 23.

Figure 5:
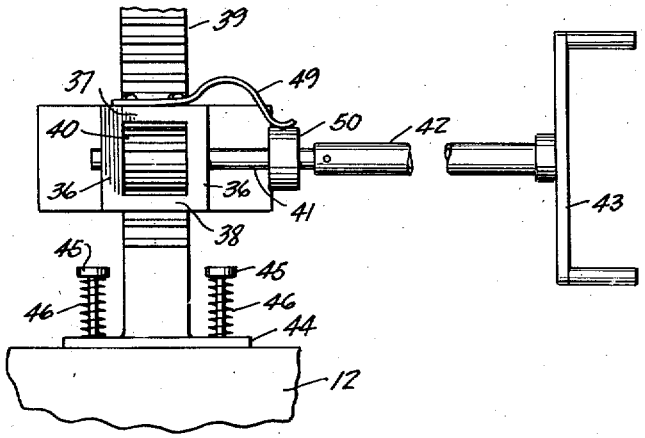
Fig. 5 is a rear view of a part of the furnace.

The holder 30 is provided with spaced extensions 36, which have straps 37, 38 (Figs. 2 and 5) connecting them at the top and bottom surfaces. These extensions thus form a guide for a rack 39. A pinion 40 is supported in the space between projections 36 and meshes with the rack 39. It is apparent that rotation of this pinion will cause the holder 30 to move up and down, and consequently the electrode structure 23 is moved up and down.

Pinion 40 for this purpose is fast on a shaft 41, journaled in projections 36. This shaft, as shown most clearly in Figs 3 and 5, has a pipe extension 42 to which a handle 43 can be fastened, for turning the pinion.

In order to make it possible to adjust the electrode structure laterally and to cause the arc to travel over the entire exposed surface of material 27, the rack 39 is movably mounted on top of the furnace cover 12. For this purpose it is provided with a foot 44 through which extend one or more guide pins or bolts 45. These bolts are fastened to the top of the furnace, and serve to permit a slight freedom of motion to the structure 23. However, a spring 46 surrounds each bolt and exerts a pressure to maintain the foot 44 pressed against the cover 12. By appropriate manipulation of handle 43, the rack 39 can be tilted against the pressure of these springs, on any of the edges of foot 44, so as to adjust the position of the arc on the material 27. In order to facilitate this adjustment, a counter-weight 47 can be used on an arm 48.

When pinion 40 is rotated to adjust the position of electrode structure 23, this adjustment can be maintained as by the aid of a spring finger 49 (Fig. 5) acting on a friction wheel 50 fastened to shaft 41.

The lower electrode 20 is clamped into a holder 51 that is entirely similar to the holder 30. This holder 51 can be fastened in any appropriate manner to the furnace structure.

Figure 7:
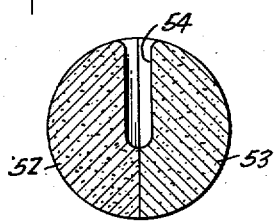
Fig. 7 is a sectional view of two half-molds, taken along a plane indicated at 7—7 in Fig. 6.
Figure 6:
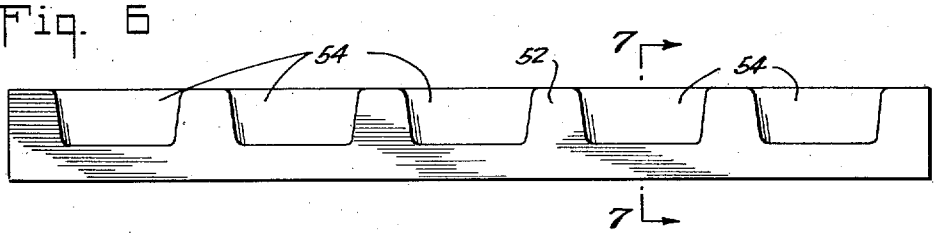
Fig. 6 is an elevation of a half-mold into which the material to be treated can be poured.

When tungsten carbide is to be made by the aid of this furnace, the mixture of metallic tungsten, tungsten oxide, and carbon, as disclosed in my prior application, is placed in a "boat" or container 28 and it is placed in the furnace. The operator then strikes the arc and through opening 19 observes its action on material 28. By experience he can manipulate handle 43 to keep the arc moving over the surface of the material 27. As soon as the operator sees that the material becomes fluid, he pours it into a relatively cool mold, such as shown in Figs. 6 and 7.

In these figures, the mold is shown as made of two semicylindrical halves 52, 53, made from carbon. The space 54 provides a cool mold to form relatively thin plates of the carbide. Carbon is useful for the mold material because it can withstand high temperatures. The material must be quickly poured in order to secure the benefits of quick chilling.

As the electrode surfaces on structure 23 wear or are disintegrated, the inner core or electrode proper 24 can be urged downwardly as by a mallet, so as to keep the vertical spacing between its active end and the annulus 26 at the correct or best value. The entire assembly 23 of course can be lowered by pinion 40 as desired.

The surface 26 and the active arcing surface forms virtually the roof of the furnace. Since it is a carbon surface, it can withstand enormously high temperatures. The electrode structure 23 being greater in diameter than the work 27 in the container 28 tends to keep heat rays away from the top of the furnace, and cause it to be reflected generally downward. A solid electrode structure could also be used.

In the present instance, the use of carbon for the electrode structures is needed for providing an atmosphere of carbon bearing gases in the furnace, whereby the formation of tungsten carbide is facilitated. However, the furnace as described can obviously be used for other processes where an extremely high temperature is required.

I claim:

1. In an arc furnace, means forming an arc chamber, an electrode structure extending into the chamber, and a work holding container below the electrode structure so as to cause the arc to play on the work, said electrode structure being substantially larger in size than the container so as to cover said work and thereby to assist in confining the heat to the work.

2. In an arc furnace, means forming an arc chamber, an electrode structure extending into the chamber, said electrode structure having an active arcing portion, a work holding container below the electrode structure, the active arcing portion thereof covering the work in the container substantially entirely, and means for maintaining the active arcing portion during operation closely above the container, said electrode structure being mounted for lateral adjustment.

3. In an arc furnace, means forming an arc chamber, an electrode structure extending into the chamber, and a work holding container below the electrode structure so as to cause the arc to play on the work, said electrode structure being substantially larger in size than the container so as to cover said work and thereby to assist in confining the heat to the work, said electrode structure being mounted for lateral adjustment.

4. In an arc furnace, means forming an arc chamber, and a movable carbon electrode extending into the chamber, having an exterior tubular part and an interior core part slidable in the exterior part, the end of the interior core part forming an arcing surface spaced from an annular surface defining the end of the tubular part, whereby the core part may be adjusted to space the active surface from the annular surface at the most favorable distance as the active surface wears.

5. In an arc furnace, a pair of spaced electrodes, one of said electrodes being composed substantially entirely of carbon, said electrodes being movable with respect to each other, means forming a confined arc chamber provided with an opening at the top, one of said electrodes being located in the bottom of said chamber, and a work holding container cooperating with the lower electrode, said carbon electrode extending into said chamber, said carbon electrode having a projection on its lower face where the arc is formed and defining a heat reflecting annular surface above the lower face of said electrode for confining some of the heat rays between the two electrodes, said projection being of substantially the same area as said work holding container.

6. In an arc furnace, means forming an arc chamber, an electrode structure extending into the chamber, said electrode structure having an active arcing portion, and a work holding container below the electrode structure, the active arcing portion thereof covering the work substantially entirely, the work container having a depth that is small as compared with its width.

7. In an arc furnace, means forming an arc chamber, an electrode structure extending into the chamber, said electrode structure having an active arcing portion, and a work holding container below the electrode structure, the active arcing portion thereof covering the work substantially entirely, the work container having an average inside depth not greater than three-fourths of the average inside width.

8. In an arc furnace, means forming an arc chamber, an electrode structure extending into the chamber, said electrode structure having an active arcing portion, an open work holding container below the electrode structure, the active arcing portion thereof covering the work substantially entirely, and a thick layer of carbon particles in the bottom of the chamber on which the work container is disposed.

9. In an arc furnace, a pair of spaced electrodes, one of said electrodes being composed substantially entirely of carbon, said electrodes being relatively movable with respect to each other, and means forming an arc chamber, the chamber having an opening of substantially the same area as the area of the chamber, said carbon electrode extending into the chamber and having an overall cross section area substantially the same as that of the opening, and said carbon electrode having a projection at its end of smaller cross section area, defining a substantial heat reflecting annular surface confining substantially all the heat rays between the two electrodes.

10. In an arc furnace, a pair of spaced electrodes, one of said electrodes being composed substantially entirely of carbon, said electrodes being movable with respect to each other, means forming an arc chamber provided with an opening at the top of substantially the same area as said chamber, one of said electrodes being located in the bottom of said chamber, and a work holding container cooperating with the lower electrode, said carbon electrode extending into said chamber and having a cross section area substantially that of said top opening, said carbon electrode having a projection on its lower face where the arc is formed and defining a heat reflecting annular surface above the lower face of said electrode for confining substantially all the heat rays between the two electrodes, said projection being of substantially the same area as said work holding container.

11. In an arc furnace, a pair of spaced electrodes, one of said electrodes being composed substantially entirely of carbon, said electrodes being movable with respect to each other, means forming an arc chamber provided with an opening at the top of substantially the same area as said chamber, one of said electrodes being located in the bottom of said chamber, and a work holding container cooperating with the lower electrode, said carbon electrode extending into said chamber and having a cross section area substantially that of said top opening, said carbon electrode having a projection on its lower face where the arc is formed and defining a heat reflecting annular surface above the lower face of said electrode for confining substantially all the heat rays between the two electrodes, said projection being of substantially the same area as said work holding container, said carbon electrode being mounted for lateral adjustment to make the arc play uniformly on the work.

12. In an arc furnace, a pair of spaced electrodes, one of said electrodes being composed substantially entirely of carbon, said electrodes being relatively movable with respect to each other, and means forming an arc chamber, the chamber having an opening of substantially the same area as the area of the chamber, said carbon electrode extending into the chamber and having an overall cross section area substantially the same as that of the opening, and said carbon electrode having a projection at its end of smaller cross section area, defining a substantial heat reflecting annular surface confining substantially all the heat rays between the two electrodes, said carbon electrode being mounted for lateral adjustment to make the arc play uniformly on the work.

13. In an arc furnace, means forming an arc chamber, said chamber having an opening of substantially the same area as the area of the chamber, and a pair of spaced electrodes one of said electrodes being composed substantially entirely of carbon and movable through the opening relatively to the other, said carbon electrode having an overall cross section area substantially the same as that of the opening and said carbon electrode having an exterior tubular part and an interior core part slidable in the exterior part, the end of the interior core part forming an arcing surface spaced from an annular surface defining the end of the tubular part, whereby the core part may be adjusted to space the active surface from the annular surface at the most favorable distance as the active surface wears.

14. In an arc furnace, means forming an arc chamber, an electrode structure extending into the chamber, and a work holding container below the electrode structure so as to cause the arc to play on the work, said container having a depth that is small as compared with its width, said electrode structure being substantially larger in size than the container so as to cover said work and thereby to assist in confining the heat to the work.

In testimony whereof, I have hereunto set my hand.

OSCAR L. MILLS.